INVENTORS.
EDMOND ADAMS
WILLIAM M. HUBBARD

METHOD OF MAKING TRANSDUCER HEAD CORES

Filed May 11, 1959 2 Sheets-Sheet 2

INVENTORS.
EDMOND ADAMS
WILLIAM M. HUBBARD

United States Patent Office 3,268,987 Patented August 30, 1966

3,268,987

METHOD OF MAKING TRANSDUCER HEAD CORES

Edmond Adams, 713 Gist Ave., and William M. Hubbard, 10606 Lilac Place, both of Silver Spring, Md.

Filed May 11, 1959, Ser. No. 812,546
16 Claims. (Cl. 29—155.5)

This invention relates to magnetic tape recording and reproducing transducer heads of the type which are used in magnetic recording systems for recording magnetic signals or for reproducing magnetically-recorded signals. More particularly, the present invention pertains to a new and improved transducer head core of dual alloy construction wherein the body portion of the core is composed of any conventional physically-soft, magnetically-soft material, such as, for example, 4–79 molybdenum permalloy or Mumetal, and the tape contacting portion of the core is constituted of a physically-hard, magnetically-soft alloy welded or metallically fused to the body portion of the core to form an integrated extension thereof.

A long existing need of the magnetic recording industry has been the necessity of providing a magnetic core material of sufficient hardness as to not be deleteriously affected by the magnetic oxide coated tapes currently used in magnetic recording systems. It is a well known fact in the recording industry that presently used magnetic head core materials are incapable of coping with the abrasive action of the moving tape upon the surface of the head and, as a consequence, are subject to excessive wear with attendant loss of high frequency response.

Moreover, due to prior art cores being of physically-soft magnetic metal, the ends of the laminations forming the interfaces of the non-magnetic gap become frayed, or smeared over, during the construction of the core and are further constrained when a conducting spacer is inserted in the gap. This constraining and fraying of the lamination ends causes virtually complete loss of high permeability at the gap interfaces, resulting in an electrical flux gap resolution that is approximately twice the physical gap dimension, thereby further decreasing the effective responsiveness thereof at high frequencies.

A major problem associated with permalloy type materials in magnetic record and reproduce heads has been their unpredictable life due to erratic widening of the gap by tape wear and reflected by diminishing response at high frequencies. This lack of predictable life in the permalloy type head materials is due to uncontrollable variations in manufacturing procedures, such as heat treatment and grinding and polishing, leaving the head material in different states of physical hardness which ultimately determines the head life. Predictable magnetic record and reproduce head life is generally desirable and is especially important in the video recording industry so that replacements can be made at regular intervals without loss of frequency response.

Several attempts have been made to solve these problems before. The most notable have been the use of magnetic ferrites and aluminum-iron alloys as head construction materials. The ferrites, being of the same kind of material as is used on the tapes, have a hardness that is eminently suited for this application and in addition possess very high resistivities. The use of ferrites in tape recorder heads has never been very successful, however, because of the brittle nature of the material and its tendency to grow large grains during heat treatment. Because of its brittle nature, the ferrites tend to chip, rather than wear away, at the gap edges thereby spoiling the resolving power of the gap. The large grains also interfere with high resolution because of the very careful lapping required to obtain a good gap fit. The aluminum-iron alloys, being metallic in nature, do not suffer from these shortcomings, but the magnetic permeability thereof is very much lower than in Mumetal, especially in thicknesses of less than .010 inch. This low permeability limits the usefulness of this material in playback application because of the inherent low sensitivity obtainable.

Another proposed solution to this problem has been to cement, with organic cements, aluminum-iron lamination pole pieces to a ferrite body to combine the advantages of the low eddy current losses of the ferrite and the good gap resolution obtainable in the aluminum-iron alloys. However, the output already low in aluminum-iron heads is further reduced by an additional air gap at the cemented joint.

An ideal core material for magnetic record and reproduce heads, of the type in which the head is in direct contact with the recording medium, would be one which not only displays low eddy current losses but is also physically hard. It is necessary that the core material display low eddy current losses, particularly in erase units, if optimum electrical characteristics are to be obtained. As to displaying physical hardness, it is evident that by utilizing a physically hard material in the tape contacting portion, the head life, which is usually limited by the abrasive action of the recording medium, will be increased. That such a combination of low eddy current losses and physically hard material is unusual is evidenced by the fact that none of the integral single recorder heads currently in use are characterized by both relative physical hardness and relatively low eddy current losses. In addition, a predictable wear life of a record and reproduce head is also most desirable.

A solution to an ideal core material for magnetic record, reproduce and erase head is advanced in application Serial No. 774,159, filed November 17, 1958, now Patent No. 2,992,474, by the same joint applicants hereof and entitled "Magnetic Tape Recorder Heads," the application described the utilization of a sintered ternary alloy of aluminum silicon-iron as a transducer head. A unique manner of fabricating this ternary alloy is described and claimed in our copending Application Serial No. 774,562, filed on November 17, 1958, now Patent No. 2,988,806.

The general purpose of the present invention is to provide a new concept in recording transducer head core construction which results in a core approximating the ideal core and possessing none of the aforedescribed disadvantages. In accordance with the concept of the present invention, the dual alloy core is formed of suitably configured body pieces of magnetically-soft, physically-soft alloy, such as, for example, 4–79 molybdenum permalloy or Mumetal (or permalloy or 47–50 nickel-iron), with metallically-integrated extensions thereof of a physically harder alloy (Sendust, Alfenol or Thermenol) defining the pole face region, or tape contact portion, of the core. In short, the tape contact section of the core is a physically harder magnetic alloy than the magnetic alloy forming the core body, the two alloys being metallically integrated. This structural arrangement provides an integral gapless high permability pole piece characterized by excellent and uniformly predictable wear resistance.

With the foregoing in mind, it is an important object of the present invention to provide a dual alloy transducer head core wherein the alloy forming the pole face region of the core is a physically harder magnetic material than the magnetic material forming the body of the core.

Another object is to provide a dual alloy magnetic head structure with a highly-permeable, physically-hard pole piece integral with a highly-permeable, physically-soft body section.

A further object is the provision of a pair of metallically adherent magnetic alloys shaped into a recording head core, the alloy of greater physical hardness forming the pole face region of the core.

A still further object is to provide a magnetic tape head that is insensitive to strain and is easy to manufacture.

Yet another object is to provide a magnetic material for a transducer core which has a longer and predictable life-use than heretofore attained.

A significant object of the invention lies in the production of a multi-structure transducer head consisting of a physically hard magnetic pole piece fused metallically integral with a magnetically soft low reluctance body.

Another object is the production of a gapless dual alloy transducer head which avoids the use of cements to bond the alloys, thereby preventing formation of an additional gap which severely decreases the output.

Still another object is to provide a transducer head having much lower power losses than heretofore attained.

An important object of the invention is the production of a magnetic recording head characterized by substantially constant hysteresis loss over the operating range of the head.

Another important object of this invention is the provision of a multi-structure record and reproduce head wherein the pole pieces, which contact the recording medium, have thinner front to back dimensions at the gap than currently used cores without any resulting degradation in wear properties, whereby the sensitivity of the head is increased as a result of the decreased area for leakage flux.

An essential object of the invention is the provision of a dual alloy transducer head which may be readily fabricated by any one of several techniques, i.e., by arc welding; by induction heating; by die-pressing followed by grinding, lapping and mating; or by stamping laminations of low reluctance magnetic material followed by either arc-welding or induction-heating to tip the laminations with a physically harder magnetic alloy.

Other objects and many of the attendant advantages of this invention will be readily appreciated as the same becomes better understood by reference to the following detailed description when considered in connection with the accompanying drawings wherein.

Figure 4:
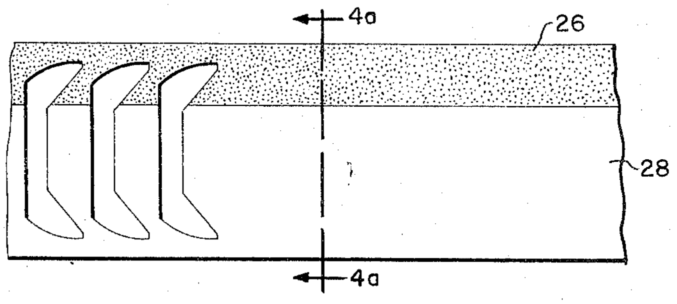
FIG. 4 is a view, in elevation, of a composite sheet, wherein core members are formed by stamping.
Figure 4A:
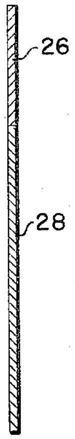
Figure 5:
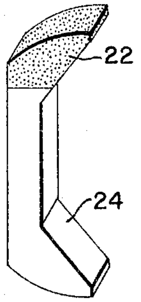
Figure 6:
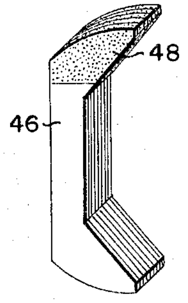
Figure 7:
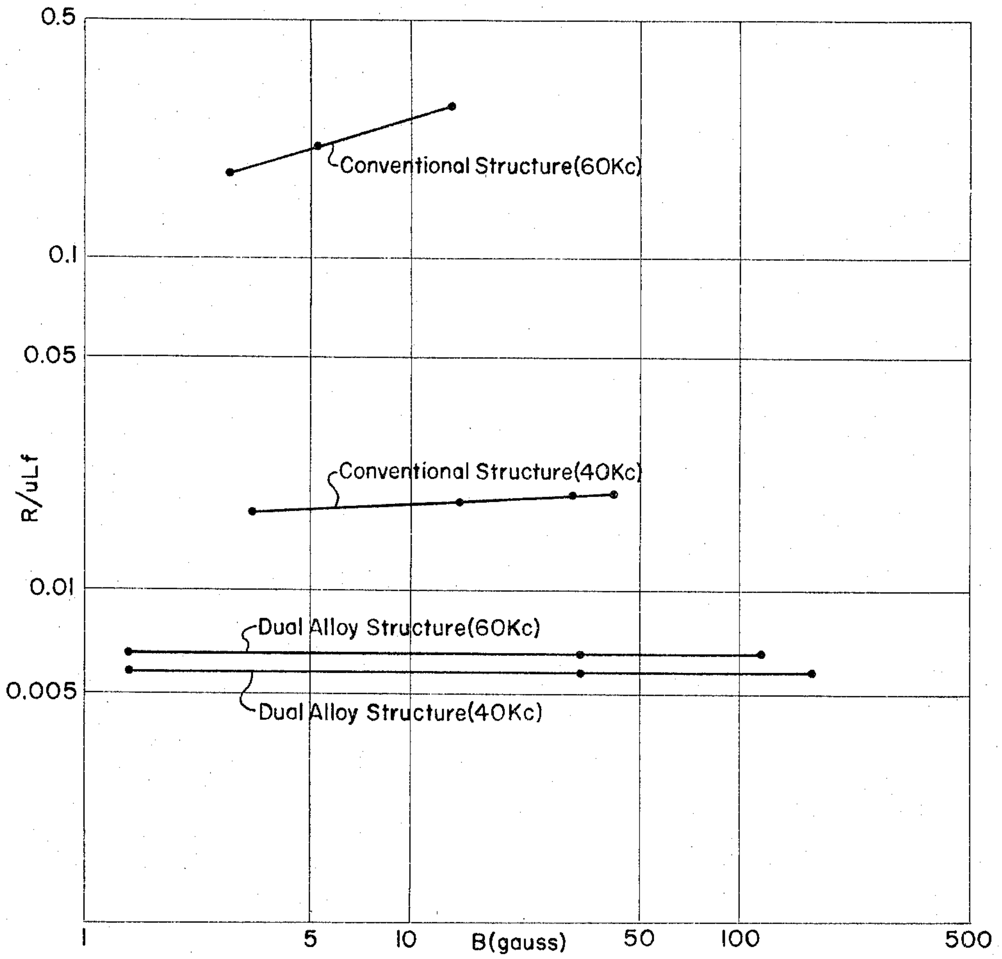
Figure 8:
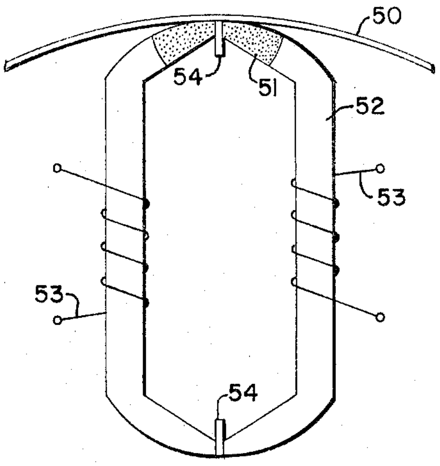

FIG. 4*a* illustrates this view in cross-section;

FIG. 5 is a view, in perspective, of a solid dual core member;

FIG. 6 is a perspective view of a transducer core member illustrating laminated body structure and a laminated tipped tape bearing surface, in accordance with the teachings of the present invention;

FIG. 7 illustrates the lower power losses obtained from dual alloy core structures made in accordance with this invention as opposed to the higher losses obtained from conventional core structure; and FIG. 8 is a schematic view of a transducer core illustrating one embodiment of the invention with all pertinent members thereof.

Figure 1:
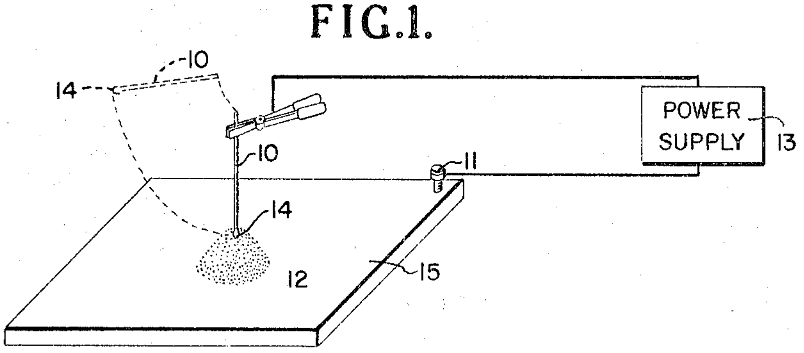
FIG. 1 illustrates one manner of fabricating one embodiment of a core in accordance with this invention.

Referring now to the drawings, there is shown in FIG. 1 a core member being manufactured according to this invention. A suitably-dimensioned, physically-soft, high-permeability material, such as 4–79 molybdenum permalloy or Mumetal, is used as an electrode 10, of square or rectangular cross-section, energized from a D.C. or A.C. power supply 13 to strike a high current, low voltage arc between it and another electrode 12 composed of a pile of powder of magnetic material disposed on an electrically conducting plate 15 having a terminal 11 connected to the other side of power supply 13. As the arc is struck, a small amount of the powder melts, as indicated at 14; and upon disrupting the arc, this molten material 14 welds to the high permeability electrode 10 and forms a solid integral structure therewith.

The powdered magnetic material may consist, in accordance with the present invention, of either powdered Sendust, Alfenol or Thermenol. Sendust is a ternary magnetic alloy consisting of silicon, aluminum and iron and is described in U.S. Patent No. 2,193,768 to H. Masumoto, et al. Alfenol is a binary alloy of aluminum and iron produced in the manner described in U.S. Patent 2,801,942 to J. F. Nachman; and Thermenol is a ternary alloy including aluminum and iron described in U.S. Patent 2,768,915 and 2,859,143 to J. F. Nachman et al.

The aforedescribed tipping operation can be performed in air, if desired, without deleterious effects because of the good oxidation resistance of the Sendust, Alfenol and Thermenol alloy powders, it being understood the operation can be performed in other gaseous media. The extent of the tip can be controlled by the selection of operating voltage, current and time.

By way of example, but not limited thereto, a dual alloy core in accordance with one embodiment of the invention may be produced by the arc-welding technique illustrated in FIG. 1 in the following manner: A 4–79 molybdenum permalloy rod, 0.072 inch square in cross-section and 1 to 3 inches long, is used to constitute the low reluctance body portion, exemplified by reference numeral 10 in FIG. 1, of the transducer head. The power supply 13 to provide the arcing potential is a D.C. motor generator having one terminal thereof electrically connected to one end of the Mo-permalloy rod. A suitable amount of Sendust alloy powder of minus 200 mesh particle size is piled on a steel plate which serves as the electrically conducting plate connected to the other terminal of the power supply.

The free end of the Mo-permalloy rod is inserted into the Sendust pile to the extent of depth, time and power necessary to obtain a desired size tape-contacting tip. In this regard, attention is directed to the fact that the extent of tipping is a design factor dependent upon the size of recording head desired to be fabricated in conjunction with the type and size of recording tape to be used with the head. Therefore, the extent of depth, time and power during insertion of the Mo-permalloy rod into the pile of Sendust powder is variable depending upon the design specifications desired. Moreover, the amount of Sendust powder employed is not critical but is determined by the extent of rod-tipping desired.

An arc is then struck between the rod and Sendust powder for about two seconds at approximately 45 volts and 100 amperes reading on the motor-generator. As a result of the arc, the Sendust powder contiguous to the immersed end of the rod melts and fuses to the end thereof, thereby providing a Sendust alloy extension formed on the end of the rod and metallically integrated therewith. Upon cooling, the resulting piece is formed into the desired shape, as illustrated in FIG. 5, by cold-working in a suitably configured die. In order to eliminate the strains incurred during the preceding operations, the structure is then subjected to a heat treating operation, it being well known to those skilled in the art that the elimination of such strains improves the magnetic properties. The heat treatment may preferably consist of annealing the structure at 1050° C. for 4 hours in a hydrogen atmosphere, although other conventional heat treatment conditions may be employed. The heat treatment is then followed by slow cooling in the same atmosphere. The structure is then ground and lapped by conventional techniques and finally wound with a coil of wire and mated with another identical structure to produce a conventional "ring structure" transducer head.

Figure 2:
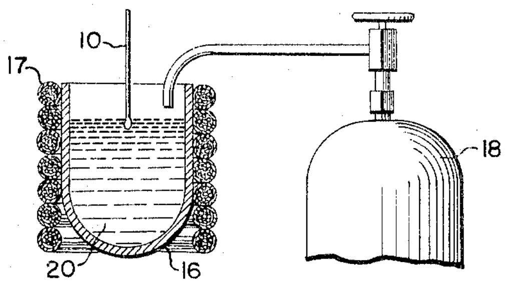
FIG. 2 shows another embodiment of a core being formed in another manner.

FIG. 2 shows a core member being tipped in another manner. For example, a .072 inch square and 1 to 6 inches long 4–79 Mo-permalloy, Mumetal or 47–50 nickel-iron alloy rod 10 is dipped into a refractory crucible 16 containing a molten alloy 20 of Sendust, Alfenol or Thermenol composition and melted by induction heating, or in any other conventional manner, indicated by 17, and protected from oxidation by a helium atmosphere provided by helium source 18. After quickly withdrawing the magnetically soft rod 10 to prevent its erosion by melting, it is found that a small amount of the physically hard but magnetically soft alloy is frozen and adheres to the permalloy type rod 10 to furnish a metallically integrated extension. The rod is then cold-worked, as aforedescribed, to the desired head structure illustrated in FIG. 5 and heat-treated preferably at 1075° C. for 4 hours in a hydrogen atmosphere to fully develop the magnetic properties. The dual alloy integrated structure is then ground, lapped and mated in a conventional manner well known in the art.

Figure 3:
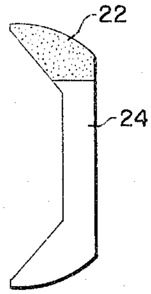
FIG. 3 is a view, in elevation, of a recording head member tipped by a molding process.

FIG. 3 is a view of the transducer head structure as manufactured by another embodiment of the invention. A mixture of powders is prepared from elemental iron plus alloy powders containing sufficient iron, silicon and aluminum to yield an alloy of a Sendust composition containing 4 to 6.5 percent aluminum, from 8 to 11 percent silicon and the balance essentially iron. The above mixture is taught in the application filed November 17, 1958 by the applicants under Serial No. 774,562. This mixture of powders is molded in a die simultaneously with a section of a preformed permalloy type lamination to yield a composite structure consisting of a magnetically-soft, physically-hard tip 22 of Sendust, and a magnetically-soft, physically-soft body 24 of 4–79 Mo-permalloy or Mumetal. This structure is then preferably heat treated in a helium atmosphere at 1175° C. for 4 to 8 hours to fully consolidate and unitarily bind the structure.

In each of the preceding examples, it is to be understood that either Alfenol or Thermenol may be used in lieu of Sendust.

FIG. 4 is an elevated view of a composite dual alloy sheet from which transducer structures can be made by stamping. FIG. 4*a* illustrates the structure of this sheet in cross section. The composite sheet is manufactured by first forming individual sheets of Alfenol or Thermenol indicated as 26, and 4–79 Mo-permalloy or Mumetal, indicated as 28. These sheets are then metallically fused by resistance welding either with a butt or overlapping joint. A series of dual alloy laminations are stamped from the flattened composite sheet and then heat treated in hydrogen at 1075° C. for 4 hours to relieve strains and improve magnetic characteristics. These laminations are then stacked, wired and mated in the conventional manner to form a transducer head.

FIG. 5 illustrates the unitary dual alloy transducer structure consisting of a magnetically-soft, physically-hard pole piece 22 and a magnetically-soft, physically-soft body 24 manufactured by methods illustrated in FIGS. 1, 2 and 3 as to characteristics, when the pole piece 22 consists of an alloy of Sendust composition, it has a Rockwell "C" hardness value of 50–55; while the 4–79 Mo-permalloy body 24 has a Rockwell "C" hardness value of 10–12.

FIG. 6 illustrates a laminated transducer structure consisting of stacked dual alloy laminations manufactured by methods illustrated in FIGS. 1, 2, 3 and 4. The dual alloy laminated structure of FIG. 6 may be obtained by stamping out laminations 46 of either 4–79 Mo-permalloy, Mumetal or 47–50 nickel-iron alloy sheet; supercoincidently stacking these single alloy laminations plurally to the desired thickness; and tipping the whole assembly with a magnetically-soft and physically-hard material 48 by either of the described in connection with FIGS. 1, 2 and 3 to provide a composite dual alloy transducer head structure. After heat-treating the structure in hydrogen at 1075 to 1175° C. for 4 to 8 hours, the time and temperature depending on the tipping alloy chosen, it is then ground, lapped and mated in a conventional manner.

An important feature of this invention is the unexpected and unexplained result that the power losses in the tipped integrated structure are lower than in corresponding head structures made solely from permalloy, Mumetal or even structures made solely from the tipping material, Sendust. FIG. 7 illustrates this phenomenon for various head structures by plotting the total loss factor $R/uLf$ against the induction (B) at several frequencies. The ordinate on the curves $R/uLf$ is a factor that is independent of the material used and the geometrical configuration. To get the absolute power loss for a head, the value of $R/uLf$ would be selected and multiplied by the permeability of the material, the inductance of the head, and the frequency to give a value for (R). This value of R is then multiplied by the square of the current ($I^2$) to get the power loss.

The slope of the curve shows how the losses due to hysteresis vary with the induction (B) levels. It can be seen that the hysteresis losses for the dual alloy head structures are constant over the wide ranges of inductance.

The separation between the curves at various frequencies shows how the eddy current losses are operating. It can be seen that the dual alloy head structures have much lower losses than the other conventional head structures.

FIG. 8 is a schematic view of a transducer core structure illustrating one embodiment of the invention with all pertinent members thereof. The magnetic recording tape 50 contacts the head only in the region occupied by the magnetically-soft, physically-hard tip material 51. The metallic conducting spacers 54 serve to establish the physical size of the gap and further, due to eddy currents, help to increase the reluctance of the gap thereby causing flux from the tape to pass through the physically-hard pole piece 51 and the physically-soft body portion 52 thus threading the pick-up coils 53. These coils are usually hooked so that they are series aiding for flux from the tape but in series opposition to stray flux from other sources thereby increasing the signal to noise ratio of the core and simplifying the shielding problem. It should be noted that the metallic spacer 54 may or may not be used in the gap that does not contact the tape depending on the electrical characteristics desired in the core, for example, inductance and insensitivity to surge currents.

The crux of this invention lies in the production of a multi-structure transducer head consisting of a physically-hard magnetic pole piece fused metallically integral with a magnetically-soft low reluctance body. Other tipping methods relying on cementing severely decrease their output by introducing an additional air gap.

An important feature of this invention is the predictability of the wear characteristics of the multiple head structure because of the high consistent hardness values obtained. Wear tests made on permalloy type head structures resulted in indications of erratic wear characteristics and show a decrease in frequency response due to enlarged gaps resulting from abrasive oxide tape wear after as little as 80 hours. Head structure manufactured by methods taught by this invention wore out only after 450–500 hours. This means a more predictable head life so replacements can be made at regular intervals.

Another important feature of this invention is that because of the high hardness values, the tipped pole pieces can be designed with one-sixth thinner front to back dimensions at the gap without degradation in wear properties over conventional head structures. Such a design increases the sensitivity of the head to recorded signals because of the decreased area for leakage flux.

Obviously many modifications and variations of the present invention are possible in the light of the above teachings. It is therefore to be understood that within the scope of the teachings herein and the appended claims, the invention may be practiced otherwise than as specifically described.

Whenever used herein or in the appended claims, the expressions Sendust, Thermenol and Alfenol shall be construed as being alloys as described in their respective patents mentioned hereinbefore.

What is claimed and desired to be secured by Letters Patent of the United States is:

1. The method of fabricating a multi-structured transducer head core having a body constituted of low reluctance, physically-soft alloy and a tape contacting portion of a low reluctance, physically-hard alloy comprising the steps of metallically and integrally fusing suitably configured material of a physically-hard alloy to form said tape contacting portion to suitably configured material of a physically-soft alloy to form said body, forming the fused materials into a desired core configuration, heat treating the formed core to develop the magnetic properties, and working the core into a dimensionally mated product.

2. The method as in claim 1 wherein the metallically and integrally fusing operation is performed by using the physically-soft alloy as one electrode of an arc welding arrangement and the physically-hard alloy as the other electrode of said arc welding arrangement, and striking an arc between the two electrodes to thereby fuse the two alloys.

3. The method as in claim 1 wherein the metallically adhering operation is performed by dipping a suitably configured solid piece of the physically-soft alloy into a molten mass of the physically-hard alloy, withdrawing said solid piece before it is eroded, and allowing the molten mass to cool.

4. The method as in claim 1 wherein the metallically and integrally fusing operation is performed by resistance welding a sheet of the physically-soft alloy with a sheet of the physically-hard alloy to form a dual alloy sheet.

5. The method as in claim 4 wherein the physically-soft alloy is a permalloy type alloy.

6. The method as in claim 5 wherein the physically-hard alloy is Alfenol.

7. The method as in claim 5 wherein the physically-hard alloy is Thermenol.

8. The method as in claim 4 wherein the core configuring operation is performed by stamping laminations from said dual alloy sheet, and supercoincidently stacking the laminations to a desired thickness.

9. The method as in claim 1 wherein the metallically and integrally fusing operation is performed by pressing a suitably configured solid piece of the physically-soft alloy in a die with the physically-hard alloy in powder form, followed by heat treating to bind said alloys.

10. The method of claim 9 wherein the physically hard powdered material is a mixture of powders or alloy powders combined in such proportions as to yield a composition of 4% to 6.5% Al, 8% to 11% Si, and the remainder essentially iron.

11. The method of fabricating a multi-structured transducer head core having a body constituted of a low reluctance physically-soft alloy and a tape contacting portion of a low reluctance physically-hard alloy comprising the steps of forming a desired core configuration with the physically-hard alloy metallurgically fused to the physically-soft alloy, heat treating the formed core to develop the magnetic properties, and working the core into a dimensionally mated product.

12. The method of claim 11 wherein the core configuring operation is performed by stacking identically configured laminations to a desired thickness, and using the stacked laminations as one electrode of an arc welding arrangement and the physically-hard alloy in powder form as the other electrode in said arc welding arrangement, and striking an arc between the two electrodes to thereby fuse the two alloys.

13. The method of claim 11 wherein the core configuring operation is performed by stacking identically configured laminations to a desired thickness, and dipping the stacked laminations into a molten mass of the physically-hard alloy, withdrawing said stacked structure before it is eroded, and allowing the metallically adhering mass to cool.

14. The method of fabricating a multi-structured transducer head core according to claim 1, wherein the alloy of said body is selected from the group consisting of Mumetal, a permalloy-type alloy, Mo-permalloy, 4–79 Mo-permalloy and 47–50 nickel-iron, and wherein the alloy constituting the tape contacting portion is selected from the group consisting of Sendust, Alfenol and Thermenol.

15. A method of fabricating a multi-structured core assembly having a body portion constituted of a low reluctance, physically-soft alloy selected from the group of Mumetal, a permalloy-type alloy and a nickel-type alloy, and a pole portion of a low reluctance, physically-hard alloy selected from the group consisting of Alfenol, Thermenol and Sendust comprising the step of metallically fusing said pole portion to said body portion to thereby alloy the pole portion and the body portion.

16. A method according to claim 15, wherein one of the body portion and pole portion is in solid condition during the fusing step.

References Cited by the Examiner

UNITED STATES PATENTS

| | | | |
|---|---|---|---|
| 1,805,534 | 5/1931 | Troy | 336—218 |
| 2,561,732 | 7/1951 | Fine | 148—11.5 |
| 2,652,520 | 9/1953 | Studders | 29—155.6 |
| 2,674,031 | 4/1954 | Buhrendorf | 29—155.58 |
| 2,674,659 | 4/1954 | Buhrendorf | 179—100.2 |
| 2,676,392 | 4/1954 | Buhrendorf | 29—155.57 |
| 2,677,019 | 4/1954 | Buhrendorf | 179—100.2 |
| 2,769,866 | 11/1956 | Kornei | 179—100.2 |
| 2,786,897 | 3/1957 | Schwarz | 179—100.2 |
| 2,804,409 | 8/1957 | Kessler et al. | 148—11.5 |
| 2,809,237 | 10/1957 | Bergmann | 179—100.2 |
| 2,908,770 | 10/1959 | Warren | 179—100.2 |
| 2,912,515 | 11/1959 | Lufcy | 179—100.2 |
| 3,000,078 | 9/1961 | Emenacker et al. | 179—100.2 |

FOREIGN PATENTS

| | | |
|---|---|---|
| 865,219 | 2/1953 | Germany. |

JOHN F. CAMPBELL, *Primary Examiner.*

L. MILLER ANDRUS, NEWTON N. LOVEWELL, ELI J. SAX, WHITMORE A. WILTZ, A. L. BRODY, D. G. REDINBAUGH, J. W. BOCK, *Assistant Examiners.*